Dec. 12, 1950 — T. H. MILLIKEN, JR., ET AL — 2,533,278
PREPARATION OF BEAD HYDROGEL AND APPARATUS THEREFOR
Filed April 24, 1945 — 3 Sheets-Sheet 1

INVENTOR
T. H. MILLIKEN JR
E. H. LEBEIS JR
BY William C. Blackburn
ATTORNEY

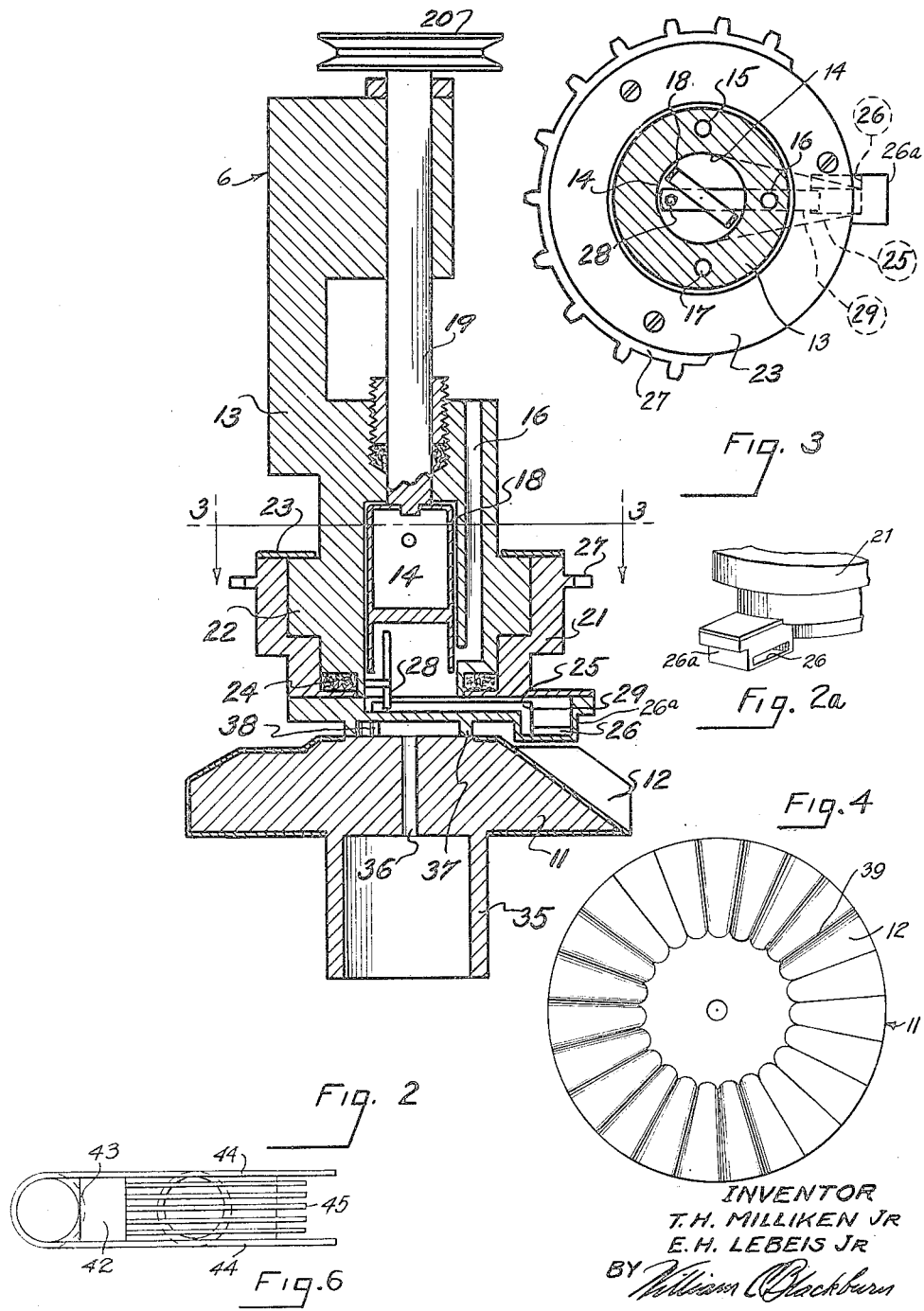

INVENTOR
T. H. MILLIKEN JR
E. H. LEBEIS JR
BY William Blackburn
ATTORNEY

Patented Dec. 12, 1950

2,533,278

UNITED STATES PATENT OFFICE 2,533,278

PREPARATION OF BEAD HYDROGEL AND APPARATUS THEREFOR

Thomas Henry Milliken, Jr., Rose Valley, and Edward H. Lebeis, Jr., Green Ridge, Pa., assignors to Houdry Process Corporation, Wilmington, Del., a corporation of Delaware Application April 24, 1945, Serial No. 590,068

7 Claims. (Cl. 252—448)

The present invention relates to new and improved methods and apparatus of handling fluids of particular utility in the production of synthetic gel type catalyst.

Two general types of catalysts in the past have been described in the literature and have been employed. One type is the powdered catalyst which is generally used in suspension. Processes using such a catalyst suspended in reactant vapors were described and tried at an early time in the development of the catalytic field, and have recently been reinvestigated and employed on commercial scale. The other type of catalyst is in the form of pills or pellets, in which each pellet is an aggregate of fine powder. Such catalysts are employed both for static and moving bed operations. Either of the above types of catalysts may be a naturally occurring material such as lime, fuller's earth, an active or activated clay or the like, either alone or with deposited catalytic or promoter material carried thereby. Likewise either type may be a synthetic gel or gelatinous precipitate, of composition catalytically active in the process to be conducted.

A recently developed distinct type is the so-called "bead" catalyst, in which the individual beads are glass-like pieces of gel. Such catalysts are desirable due to the modified rate of penetration of gas, including vapors, into and out of the individual pieces, resulting in modified catalytic properties due to physical properties considerably different from aggregate catalysts. This type of catalyst is entirely different physically from the aggregate catalyst since the structure of the gel as it sets is maintained through the finishing operations of purifying and drying.

The present invention is particularly directed to the production of "bead" type catalyst. Catalysts of this type are produced by suspending drops of aqueous gel forming liquid in a water immiscible liquid for a sufficient time that the drops set. The aqueous liquid is such as will set to a gel including all the components of the liquid if given sufficient time or if setting is accelerated as by heating or change of pH. The aqueous liquid in addition to being a solution or sol, may additionally include insoluble materials, such as an initially produced gelatinous precipitate or a finely divided insoluble powder of any desired composition. After setting, the beads of hydrogel are separated from the water immiscible liquid, and then finished for use.

One of the problems in the manufacture of "bead" type catalyst is the maintenance of substantially uniform size. If there is any substantial variation in the size of the drops as formed, the larger drops rise or fall through the suspending liquid at a greater rate than the smaller drops. Accordingly, the larger drops coalesce with other drops, resulting in an extremely large variation in size.

Objects of the present invention are to provide improved methods and apparatus for the handling of fluids especially in the production of catalyst of the stated type; to provide methods and apparatus for forming drops of equal size of one liquid in a liquid immiscible therewith; and to provide methods and apparatus for the production of small gel pieces at a high rate.

In accordance with this invention a stream of liquid moving downwardly is produced by ejecting the stream of liquid in a horizontal direction, moving the point or zone of ejection in a horizontal plane, maintaining the direction of ejection opposite the direction of movement of said zone, and maintaining the linear rate of ejection equal to the rate of movement of the point of ejection. This process is of special importance in catalyst production methods in which a predetermined quantity of a liquid which will set to a gel under the conditions of operation is introduced into an inclined groove partially submerged in a body of liquid immiscible therewith. The gel forming liquid, being introduced into the groove at a level above the level of the body of liquid, runs down the groove and comes to rest at the surface of the body of liquid. The gel forming liquid is allowed to remain in the groove for a time sufficient to allow it to coalesce as a drop. Before the drop sets to a gel some of a liquid which is immiscible with the gel forming liquid is introduced above the drop into the groove, whereby the drop is moved out of the groove into the body of liquid. By the method of this invention, a high rate of production is obtained.

The drops of liquid may either float upon or descend through the body of liquid, while setting to gel. When the drops descend through the body of liquid into the lower portion of the body, the drops are there entrained by a stream of the liquid which stream carries them out of the body of the liquid through an upwardly rising column of the liquid to a fixed overflow from the column. The mixture of gel pieces and liquid is separated and the liquid returned to the bottom of the body of liquid. The drops alternatively may set to gel pieces while floating on the body of liquid and be entrained by a stream of liquid which conveys the drops to an overflow. The drops set to gel before discharge to the overflow. From the overflow the mixture of gel pieces and liquid is separated, the separated liquid being returned to the body of liquid. This method which involves floating the drops of gel forming liquid on a liquid immiscible therewith produces improved bead type catalysts in which the gel pieces are of oblate spheroidal form.

Preferred apparatus in accordance with the present invention and for carrying out the process of this invention is disclosed in the accompanying drawings in which:

Fig. 2 is a vertical section through a preferred form of apparatus for forming hydrogel beads;

Fig. 2a is a fragmentary perspective view illustrating a detailed feature of the invention;

Fig. 3 is a section on the line III—III in Fig. 2;

Fig. 4 is a plan of the grooved plate shown in section in Fig. 2;

Fig. 6 is a plan of the separator shown in the upper right-hand portion of Fig. 1;

Figure 1:
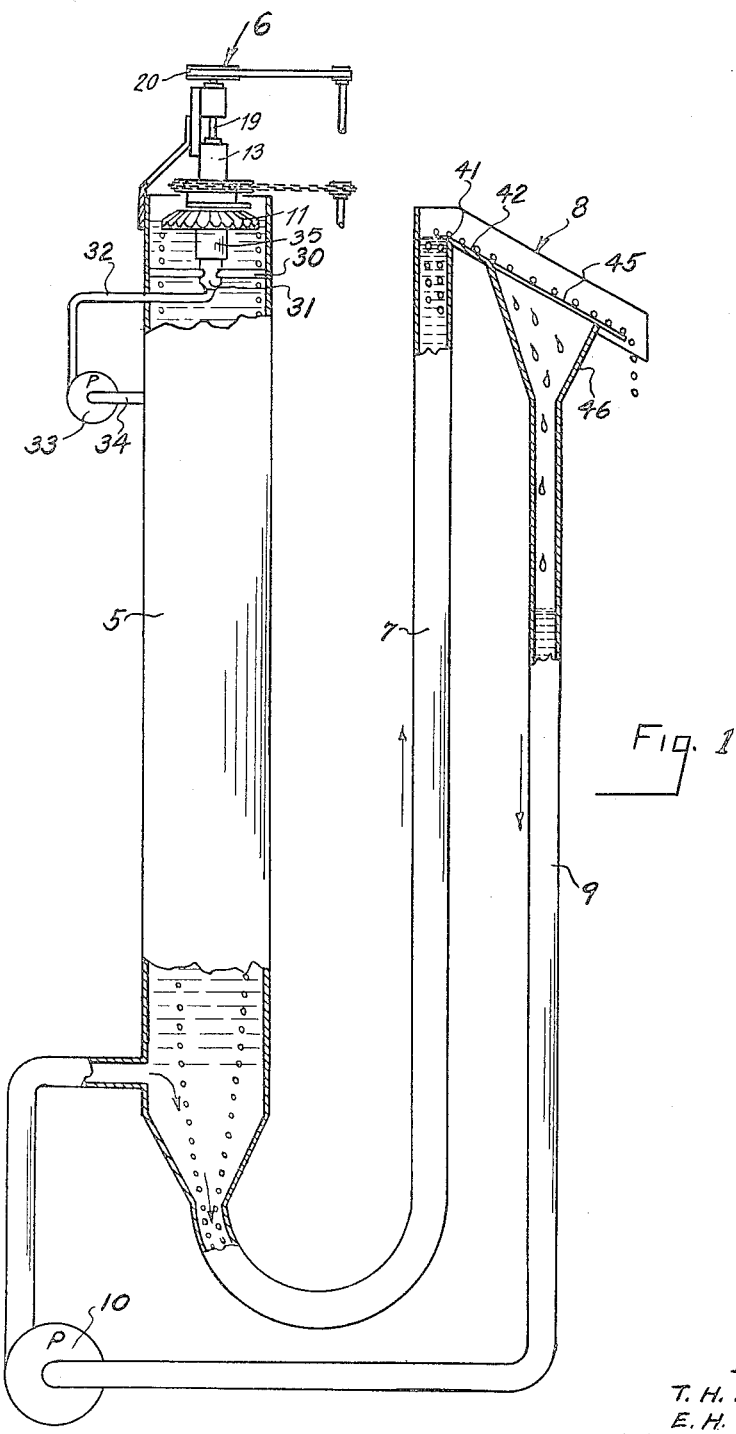
Fig. 1 is an elevation of a preferred form of apparatus in which the drops of liquid descend through the suspending liquid, parts being broken away to show internal construction.

The form of the invention shown in Fig. 1 involves a column 5 containing a suspending liquid. The column 5 has at its upper end a device 6 for forming drops of liquid in the suspending liquid. A balancing leg 7 balances the liquid in the column 5. The column 7 has at its upper end a separator 8 shown more particularly in Fig. 6 for separating hydrogel beads from the liquid. A liquid return pipe 9, provided with a pump 10, receives liquid from the separator 8 and introduces the liquid into the lower end of the column 5.

The liquid in the columns 5 and 7 and in the return pipe 9 is a liquid immiscible with the liquid of which drops are formed. Further, the specific gravity of the liquid in the system is less than the specific gravity of the drop forming liquid. Therefore, the drops will move downwardly through the suspending liquid in the column 5. When the drops descend to the bottom of the column 5 they are entrained by a stream of liquid which moves upwardly in the column 7. At the upper end of the column 7 the liquid, with the hydrogel pieces carried thereby, overflows from column 7 into separator 8, and the liquid returns by the pipe 9 through the pump 10 to the lower portion of the column 5. It is to be noted that the liquid levels in columns 5 and 7 are different. When the liquid is not flowing through the column 7, the levels are the same. When flow is initiated by starting the pump 10, the level in column 5 increases to balance the additional force resulting from resistance to flow through the column 7. By variation of the rate of flow through column 7, it is possible to control accurately the level in column 5.

The liquid used in columns 5 and 7 may be the same, though if desired two immiscible liquids may be employed, the liquid in column 5 being of lower specific gravity than that employed in the entraining stream including column 7. An example of such a pair of liquids, suitable for use here, is oil and water.

The device 6 for forming drops is shown more particularly in Figs. 2 and 3. This device involves a mixer for preparing a solution which will set to a gel under the conditions prevailing in column 5 and for delivering a stream of the solution to a circular plate 11 or member provided with inclined grooves or flutes 12 positioned about its periphery in positions inclined outwardly and downwardly. The mixer comprises a body member 13 which has a mixing chamber 14 located centrally in the lower portion thereof. The body member 13 is provided with passages 15, 16 and 17 which communicate through the body member into the mixing chamber 14. These passages 15, 16 and 17 may open into the mixing chamber at various levels. Thus the passages 15 and 17 may enter the mixing chamber in the upper portion thereof for the introduction thereinto of gel forming reagents whereas the passage 16 may enter the mixing chamber in the lower portion thereof for the introduction into the mixed solutions of a setting agent to accelerate the setting of the gel formed from the mixed solutions. In order to promote mixing of the solutions in the chamber an agitator 18 is provided in the chamber, which agitator is carried by a shaft 19 provided with a pulley 20.

The lower end of the body member 13 is circular in section and is provided with a rotatable head 21 mounted thereon. The body 13 has a flange 22 thereabout which fits into a recess in the rotatable head 21. A cover plate 23 is secured to the upper end of the head 21 to hold the head on the body member. A packing 24 is placed between the body member and the head to prevent leakage of the mixed solutions from the chamber 14 through the joint between the body member and the rotatable head. The head 21 has a passage 25 in communication with and extending laterally from the chamber 14 to an outlet opening or orifice 26 formed in the rear vertical wall of a box-like housing 26a, Fig. 2a. This outlet opening moves above the upper ends of the grooves or flutes 12 in the plate 11 and is positioned to direct a stream of the mixed solutions in a horizontal direction tangential to the circumferential path of travel of the outlet opening when the head 21 is rotated on the body member 13; or stated otherwise, in a direction normal to a radius of such circumferential path. A sprocket 27 is secured to the head to effect rotation thereof. A pin 28 is secured to the body member in an eccentric position in the lower portion of chamber 14. A cleaning arm or bar 29 is positioned in the passage 25. One end of the bar 29 is slidable in the passage in a position proximal to the opening 26. The other end of the bar 29 is pivotally carried by the aforesaid pin 28. Upon rotation of the head, the bar rotates about the pin 28 which, being eccentric to the axis of rotation of the head, gives the bar the motion of a pitman with respect to the head. This movement laterally and longitudinally of the passage prevents accumulation of gel therein.

The brackets 30 secured near the upper end of column 5 are secured to a short length of pipe 31. The lower end of pipe 31 communicates with pipe 32 which communicates in turn with the outlet of pump 33. The inlet pipe 34 of pump 33 communicates directly with the liquid in column 5, for receiving liquid from the column and introducing it into the pipe 31 through the pump 33 and pipe 32.

The plate 11 is provided with a downwardly extending circular flange 35. This flange may be threaded for engagement with the pipe 31 or it may be permanently secured to pipe 31 as by brazing. The plate 11 is provided with a passage 36 which extends from within the flange 35 to the upper surface thereof. The rotatable head 21 of the mixer has a flange 37 which extends therefrom into sliding contact with the upper surface of plate 11, which flange 37 has a passage 38. Accordingly liquid will be delivered from the pump 33 through the passage 36 into the chamber defined by plate 11 and flange 37, and thence through passage 38 into the flutes or grooves 12.

As shown in Figs. 2, 3, and 4, the plate 11 is circular with a plurality of radially extending inclined grooves or flutes 12, inclined downwardly and outwardly. The dividing walls 39 between the flutes have relatively sharp edges. The flutes may have either conical walls radiating from the axis of the plate, as in a bevel gear, or the walls thereof may be cylindrical. The surface of the grooved plate 11 should be of such a material that it will not be wet by the solution introduced thereonto from the mixer. In general the solution from the mixer is an aqueous solution and accordingly the plate 11 carries a coating of a suitable water repellant material such as a hard wax, rosin, or a water repellant synthetic resin. Such a coating prevents build-up of gel upon the surface of plate 28.

The upper end of the column 7 is cut away on one side to the level 41. A plate 42 is secured to the pipe at its upper edge 41 and extends as shown half-way around the pipe. The plate 42 is bent downwardly at 43. Side walls 44 are secured to the column 7 from the plate 42 upwardly. The side walls 44 have their lower edges secured to the edges of plate 42. A series of parallel spaced bars 45 are positioned between the side walls 44 and in a position inclined outwardly and downwardly from the column 7 as an extension of the plate 42. These bars 45 are positioned sufficiently closely together that beads of gel delivered to the separator 8 do not fall between the bars, but roll off the lower ends of the bars. A funnel 46 has its upper edges secured to the two side walls and to the plate 42 to receive liquid passing between the bars. The lower end of funnel 46 communicates with pipe 9 for delivering the liquid thereto.

In operation, starting with the system shut down and with the columns 5 and 7 and the pipe 9 containing liquid, the pump 10 is started. The pump 10 is driven at a rate to raise the level of the liquid in column 5 part way up the grooves 12. Rotation of the shaft 19 is then initiated. The mixer is filled with solutions introduced through the pipes 15 and 17 and the solutions are continuously fed through these pipes. A solution, such as for accelerating setting of the gel, is then introduced through pipe 16.

The concentrations and relative proportions of the solutions introduced through the pipes 15, 16 and 17 are proportioned and the total rate of feed so adjusted as to give a setting time such that the solution will not set to a gel until the drops of gel are suspended by the quiescent body of suspending liquid in column 5. Increase in the total rate of feed effects a decrease in the time interval between mixture and suspension in the suspending liquid. Adjustment of the concentration of the solutions, including in this the concentration of buffering material and other materials such as acids for adjusting the pH, control the setting time. Such control by adjustment of these variables and adjustment of temperature is within the present skill of the art.

The mixer, constructed as above described, results in an exceedingly short time interval elapsing between the mixing of the solutions and the introduction of the mixed solution in the groove. This short time interval makes it possible to operate satisfactorily with a very short time interval between the deposition of the solution in the grooves and the setting of the drops of solution to gel. This in turn makes it possible likewise to employ a relatively short column 5.

As the head 21 rotates, the opening traverses the grooves in the plate 11, and equal portions of the solution are deposited in the various grooves. The portion of solution in each groove will run down the groove and coalesce as a drop resting at the surface of the suspending liquid. After the portion of solution has coalesced, the outlet 38 delivers a portion of suspending liquid to the groove which liquid moves the coalesced drop of solution out into the body of liquid. The suspending liquid also wets the grooves with a film of the liquid between each delivery of drop forming liquid to the flutes, thereby preventing chance build-up of gel in the flutes.

By having the stream of solution from the outlet 26 directed tangentially to the path of travel of the outlet and facing in the direction opposite to the direction of movement thereof, it is possible to run at a high rate. Thus, the solution may be delivered from the outlet 26 at a linear rate equal to the circumferential rate of movement of the opening 26. With the liquid thus delivered at said equal rate any tendency to impinge the solution against the walls 39 between flutes 12 is overcome, thereby avoiding breaking up of the solution at the time it should be coalescing. Since centrifugal force is not a limiting factor of operation, high rates of operation, high rates of operation may be employed.

The column 5 is sufficiently high that the drops of solution set to gel by the time they have descended to the lower end of the column. The necessary height of column will vary depending upon the setting time of the gel and upon the rate of descent of the drops through the quiescent suspending liquid. This rate of descent is controlled by the relative densities of the drops and of the suspending liquid, by the size of the drops, and by the viscosity of the suspending liquid.

The linear rate of flow of the entraining stream of suspending liquid in column 7 is greater than the rate of descent of the gel beads in the liquid, whereby the gel beads are elevated to the upper end of column 7 and discharged to the separator 8. The level 41 at the upper end of column 7 is positioned slightly below the level of plate 11. The difference in elevation is made sufficiently great that the rate of flow in column 7 to raise the level of the liquid in column 5 to the plate 11 is likewise sufficiently great to carry the drops upward in column 7.

Figure 7:
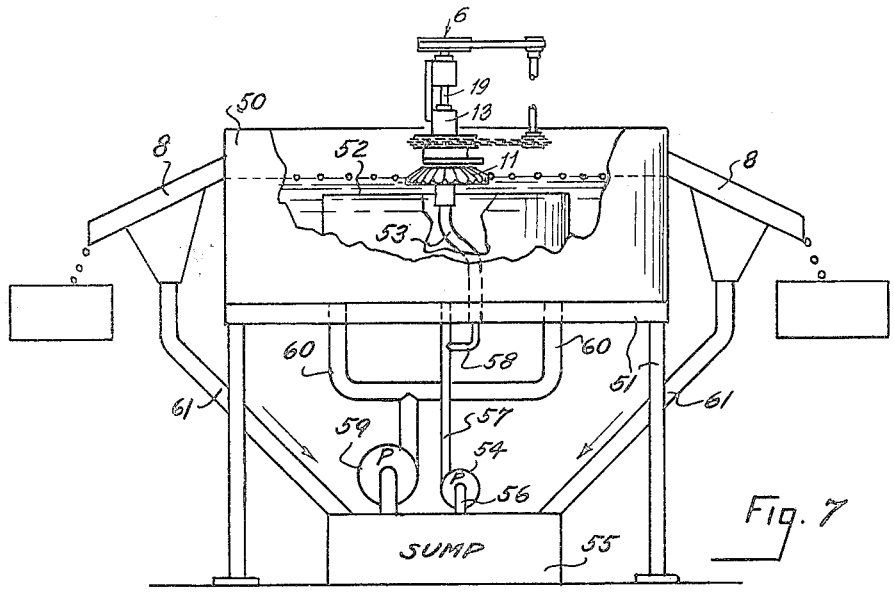
Fig. 7 is an elevation of a system in accordance with this invention in which the drops of liquid float upon the suspending liquid, parts being broken away to show internal construction.
Figure 5:
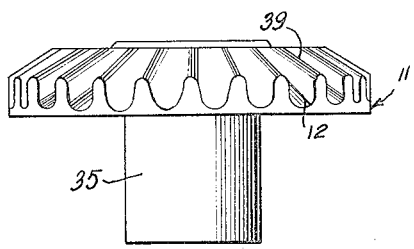
Fig. 5 is an elevation of the plate shown in Fig. 4.
Figure 8:
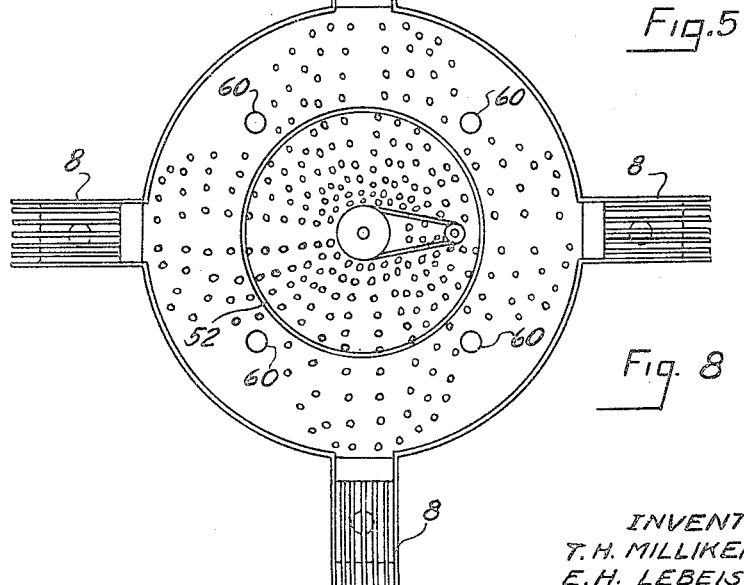
Fig. 8 is a plan of the system shown in Fig. 7.

In the modified form of this invention shown in Figs. 7 and 8 the drops of liquid are of lower density than the suspending liquid whereby the drops float upon the surface of the suspending liquid. A shallow tank 50 is supported by a suitable frame 51. The tank 50 is provided with a plurality of separators 8 as shown and described in connection with Fig. 1. A smaller tank 52 is positioned within the tank 50, the upper edge of the tank 52 is being slightly below the overflow level into the separators 8. A drop forming device 6 as shown and described in connection with Fig. 1 is supported centrally of the two tanks by a pipe 53 rigidly mounted in the base of the tanks. To provide for vertical adjustment of the grooved plate 28 with respect to the liquid level in the tank 59, the plate may be screw threadedly supported upon the upper end end of the pipe 53 and provided with a set screw to secure it in adjusted position. This described construction provides a central quiescent body of suspending liquid and an annular zone of suspending liquid therearound for entraining the drops in a stream of the liquid and carrying them to the separators. A pump 54 is provided to draw suspending liquor from the sump 55 by pipe 56. Pipe 57 communicates from the outlet of pump 54 to the bottom of the tank 52. A branch pipe 58 in communication with the pipe 57 introduces suspending liquid into the pipe 53 for supplying the suspending liquid to the grooved plate. A second pump 59 of substantially greater capacity is positioned to draw suspending liquid from the sump 55. A series of pipes 60 in communication with the outlet of pump 59 introduces suspending liquid into the base of the annular zone of tank 59. Return pipes 61 communicate from the separators 8 to the sump 55 to return liquid thereto.

In the operation of the form of this invention shown in Figs. 7 and 8 a suspending liquid is employed which is relatively heavy with respect to the liquid from which the drops are to be formed. Thus, when the drop forming liquid is an aqueous solution or a sol of a silicate or other inorganic or organic material, halogen substituted organic liquids are suitable, such as carbon tetrachloride.

Drop forming liquid is deposited upon the grooved plate 11 as heretofore described, and moved out of the grooves or flutes in the plate by the stream of suspending liquid. The suspending liquid in the tank 52 and immediately thereabove is substantially static. The liquid feed through pipe 57 and from the head creates a slight outward movement from the center of the tank 52 which floats the drops to the annular portion of tank 59. The liquid introduced through the pipes 60 into this annular body of liquid creates streams of liquid which entrain the drops which in the case of gel have already set as gel, and carry the hydrogel drops to one of the separators 8, wherein the suspending liquid is separated from the hydrogel and returned to the sump.

It is to be noted in this connection that when drops of suspended liquid are floated upon the surface of the suspending liquid and, while so floating, set as a gel, the gel pieces so produced, rather than being truly spherical, are in fact oblate spheroids. This modification in the physical form of the pieces results in substantial improvements in properties. When the gel pieces so produced are dried and employed as catalysts, the improvement, resulting from the increase in apparent surface with respect to catalyst volume in cyclic processes such as catalytic cracking, wherein operation is alternately on stream for the conversion of hydrocarbons and in regeneration for the burning of coke-like deposit from the catalyst, being apparent in both stages of the cycle.

The present invention is applicable broadly to any use in which it is desired to produce uniform size drops of one liquid suspended in another. More particularly, this invention is applicable to the production of equal size drops of gel forming liquids. Thus, the present invention may be applied to the production either of organic gels in bead form such as beads of gelatin, soap, or the like, or of inorganic gels.

Preferably the beads are inorganic gels, such as beads of metallic oxide or hydroxide hydrogels. This invention is of special importance in the production of silicious gels, such as silica gel, which may contain one or more other oxides or hydroxides, such as alumina, zirconia, beryllia, thoria, titania, urania, vanadia, chromia, magnesium oxide, manganese oxide, lithium oxide, and the like. Furthermore, the silicious gel so produced may contain other insoluble components such as zirconium phosphate. The fluid from which the beads are made may likewise contain finely divided powders of a size less than about 50 microns, for improvement in the drying characteristics of the gel, particularly for the prevention of breakage during drying of the hydrogel to the dried gel state, as shown in copending application of Thomas H. Milliken, Ser. No. 529,594, filed April 5, 1944 (now Patent No. 2,487,065). The disclosed inorganic gels are of particular importance in hydrocarbon conversion processes, such as in the cracking of higher boiling hydrocarbons to gasoline, in the treating of gasoline for improvement of octane and reduction in acid heat, and in the polymerization, alkylation, and isomerization of hydrocarbon gases.

In order to prepare the pieces of hydrogel, formed in accordance with the above described process, for use as catalyst in hydrocarbon conversion processes, soluble impurities are first removed from the gel by washing with water or with an aqueous solution of an acid or acidic salt, such as ammonium chloride. In the case of silicious gels formed from sodium silicate solutions, this described purification removes the sodium from the gel. The discrete pieces of gel are then dried. If desired, the dried gel may be calcined in accordance with the processes described in the copending application of John R. Bates, Ser. No. 447,232, filed June 16, 1942 (now Patent 2,375,757), or of H. A. Shabaker, Ser. No. 538,711, filed June 3, 1944 (now abandoned).

There is considerable latitude in the mode of application of the process hereof as above indicated. The specific types of procedures described accordingly should be taken as illustrative of and not as definitive of the range of procedures to which this invention is applicable since the specific procedure may be modified in various respects. Thus, in the manufacture of silicious gels, such as silica-alumina coprecipitated gels, the drop forming liquid may be either an acidic or a basic sol of silica and alumina, and the suspending liquid basic or acidic respectively whereby the setting time of the sol is considerably reduced. Likewise, the suspending liquid may be maintained at an elevated temperature in order to accelerate setting of the sol. In this instance, with an oil employed in the suspending liquid, increase of the temperature will decrease the viscosity. This results in an increase rate of downward movement of the drops in the liquid. While this would tend to increase the requisite depth of body of suspending liquid, this is offset by the shortened setting time resulting from the increased temperature.

It is further to be noted that the liquid introduced into the groove to move the drop forming liquid into the quiescent body of suspending liquid does not necessarily have to be of the same composition as the suspending liquid. For example, when an aqueous sol and an acidic or basic oil for accelerating setting of the sol are employed, a neutral oil may be introduced into the groove whereby to avoid the tendency of the oil so introduced to accelerate the setting of the sol. Likewise, the liquid introduced may be immiscible both with drop forming liquid and with the suspending liquid. Thus, the system may involve an aqueous sol, an oil as the suspending liquid, and mercury as the liquid for moving the sol into the oil, in which case the mercury would be collected at the bottom of the body of oil and recirculated.

While it is preferred to separate the gel pieces and the suspending liquid by producing a stream of the mixture to flow to a separator, other means may be employed such as a mechanical elevator for raising the gel pieces from a point of collection at the bottom of column 5 through a quiescent column of liquid hydrostatically balancing column 5.

We claim as our invention:

1. In an apparatus for the production of drops of one liquid in a suspending liquid, comprising in combination a tank for containing a suspending liquid, a circular plate having flutes in its upper surface around the periphery thereof downwardly and outwardly inclined, means for supporting said plate within said tank at the surface of the suspending liquid with each flute partially submerged in said liquid, a nozzle mounted for rotation with the outlet of the nozzle movable over the flutes serially, the nozzle being positioned so that the outlet thereof is directed approximately in a horizontal direction tangentially of its path during rotation, and positive means for rotating the nozzle in a direction opposite to the direction in which the outlet opens.

2. In an apparatus for delivering a stream of sol in a circular locus, which comprises a housing having a recess therein forming a mixing chamber, said mixing chamber having an open lower end, said housing having ports therein communicating with said recess for the introduction of reactants into said mixing chamber, a closure for the lower end of the chamber mounted for rotation about a vertical axis, said closure having a passage communicating with said chamber, said passage extending laterally from the chamber and terminating in an outlet opening, said passage being at said outlet opening in a direction substantially parallel to the circumferential path described by rotation of said closure, and a movable bar positioned in the passage, one end of which is slidable in the passage at a position proximal to said outlet opening and the other end of which is pivoted at a fixed point in said chamber spaced from said axis of rotation, whereby said bar has the movement of a pitman with respect to the closure.

3. In apparatus of the character described, a stationary support, a liquid delivery member rotatably mounted on said support for rotation about a vertical axis, mechanical drive means for rotating said member about said vertical axis effecting thereby horizontal movement of said member through a circumferential path, said support formed to provide a passage therein for conveying liquid therethrough and thence to the member, said member being formed to provide a passage communicating with the passage in said support and terminating in a horizontally directing outlet for discharge of the liquid from said member, the passage formed in said member being at said outlet in a direction substantially parallel to a tangent to said circumferential path of movement of said member and said outlet facing in a direction horizontally opposed to the direction of rotation of said member.

4. Apparatus for forming hydrogel pieces comprising a vertically disposed stationary body provided with a hollow recess therein forming a mixing chamber, said body being further provided with ports communicating with said recess for the introduction of liquids therethrough into said mixing chamber, a liquid discharging head mounted for rotation about a vertical axis, said head being provided with a passage therein communicating with the mixing chamber and extending laterally from the axis about which the head is rotatable, positive drive means associated with said head to effect rotation of said head continuously through a circumferential path, the passage in said head being formed to provide a horizontally directed outlet disposed in a direction substantially parallel to a tangent to the circumferential path of travel of the head and facing in a direction horizontally opposite to the direction of movement of said head, said drive means being operative to rotate said head at a controlled rate, whereby the circumferential rate of movement of said head can be correlated with respect to the linear rate of discharge of liquids therefrom.

5. In an apparatus for the production of beads of inorganic gel, the combination of a horizontal circular plate having a plurality of downwardly and outwardly inclined flutes around its periphery, and a sol mixing and delivery head comprising a stationary support and a discharge member rotatably carried by the support for rotation about a vertical axis, said support having a passage for conveying sol therethrough and thence to the discharge member, the discharge member having a passage communicating with the passage in the support and terminating in an outlet spaced radially from said vertical axis of rotation so that said outlet moves over the flutes upon rotation of discharge member, the passage in said discharge member being at said outlet in a direction substantially parallel to a tangent to the circumferential path described by the travel of said head upon rotation of said discharge member, and said outlet facing in a direction horizontally opposed to the direction of movement of said discharge member, thereby to effect discharge of sol horizontally and tangentially to the path of movement of the outlet, and mechanical drive means for rotating said discharge member.

6. The method of producing pieces of hydrogel which comprises: supplying to a mixing zone reactant solutions forming a liquid reaction mixture capable of setting to a hydrogel, agitating and admixing the solutions so supplied in said mixing zone to form such liquid reaction mixture, continuously flowing the reaction mixture to a distributing zone, and ejecting substantially horizontally a stream of the reaction mixture from said distributing zone before the reaction mixture has set to hydrogel, said reactant solutions being supplied to said mixing zone at a controlled rate, which rate determines the rate of flow of the reaction mixture to said distributing zone and thereby fixes the linear rate of ejection of the stream of reaction mixture from said distributing zone, circumferentially moving said distributing zone in a direction approximately horizontally opposite to the direction of ejection of the stream therefrom and about a vertical axis to thereby continuously move the point of ejection of said stream over a locus defined by a circular path, and maintaining the rate of circumferential movement of said distributing zone equal to the linear rate of ejection of said stream therefrom, whereby the horizontal components of forces acting on said reaction mixture so ejected are equal and said ejected reaction mixture is caused to fall upon ejection in approximately vertical direction, and admitting the reaction mixture so ejected to a gelation zone.

7. The method of producing pieces of hydrogel which comprises: supplying to a mixing zone reactant solutions forming a liquid reaction mixture capable of setting to a hydrogel, agitating and admixing the solutions so supplied in said mixing zone to form such liquid reaction mixture, continuously flowing the reaction mixture to a distributing zone, and ejecting substantially horizontally a stream of the reaction mixture from said distributing zone before the reaction mixture has set to hydrogel, said reactant solutions being supplied to said mixing zone at a controlled rate, which rate determines the rate of flow of the reaction mixture to said distributing zone and thereby fixes the linear rate of ejection of the stream of reaction mixture from said distributing zone, circumferentially moving said distributing zone in a direction approximately horizontally opposite to the direction of ejection of the stream therefrom and about a vertical axis to thereby continuously move the point of ejection of said stream over a locus defined by a circular path, and maintaining the rate of circumferential movement of said distributing zone equal to the linear rate of ejection of said stream therefrom, whereby the horizontal components of forces acting on said reaction mixture so ejected are equal and said ejected reaction mixture is caused to fall upon ejection in approximately vertical direction, dividing the stream of reaction mixture so ejected into substantially uniform liquid segments, coalescing the liquid segments to form drops at the surface of a body of water immiscible liquid, admitting said drops into said body of water immiscible liquid and moving the drops through said water immiscible liquid during a period that said drops set to hydrogel therein.

THOMAS HENRY MILLIKEN, Jr.
EDWARD H. LEBEIS, Jr.

REFERENCES CITED

The following references are of record in the file of this patent:

UNITED STATES PATENTS

| Number | Name | Date |
|---|---|---|
| 539,657 | Van Horn et al. | May 21, 1895 |
| 1,447,898 | Schlossstein | Mar. 6, 1923 |
| 2,238,204 | Woods | Apr. 15, 1941 |
| 2,335,332 | Wright | Nov. 30, 1943 |
| 2,384,455 | Daley | Sept. 11, 1945 |
| 2,385,217 | Marisic | Sept. 18, 1945 |